(12) United States Patent
Kasaba et al.

(10) Patent No.: US 9,067,533 B2
(45) Date of Patent: Jun. 30, 2015

(54) VEHICLE LAMP CONTROL DEVICE AND VEHICLE LAMP SYSTEM

(75) Inventors: Yusuke Kasaba, Shizuoka (JP); Masashi Yamazaki, Shizuoka (JP); Atsushi Toda, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 458 days.

(21) Appl. No.: 13/486,429

(22) Filed: Jun. 1, 2012

(65) Prior Publication Data

US 2012/0310486 A1 Dec. 6, 2012

(30) Foreign Application Priority Data

Jun. 3, 2011 (JP) .................................. 2011-125210

(51) Int. Cl.
*B60Q 1/10* (2006.01)
*B60Q 1/08* (2006.01)

(52) U.S. Cl.
CPC .. *B60Q 1/10* (2013.01); *B60Q 1/08* (2013.01); *B60Q 2300/114* (2013.01); *B60Q 2300/132* (2013.01)

(58) Field of Classification Search
CPC ...... B60Q 1/08; B60Q 1/10; B60Q 2300/056; B60Q 2300/114; B60Q 2300/132
USPC ............................... 701/36, 49; 362/464–466
See application file for complete search history.

(56) References Cited

U.S. PATENT DOCUMENTS

| 5,896,011 | A | 4/1999 | Zillgitt |
| 6,430,521 | B1 | 8/2002 | Toda |
| 2004/0105272 | A1 | 6/2004 | Toda et al. |
| 2004/0125608 | A1 | 7/2004 | Izawa |
| 2010/0106358 | A1* | 4/2010 | Lu et al. .......................... 701/29 |

FOREIGN PATENT DOCUMENTS

| CN | 101181886 A | 5/2008 |
| EP | 1930690 A1 | 6/2008 |
| EP | 2402212 A2 | 1/2012 |
| EP | 2447127 A2 | 5/2012 |

(Continued)

OTHER PUBLICATIONS

Massel et al., "Identification of Road Gradient and Vehicle Pitch Angle", Proceedings of the 2004 IEEE International Conference on Control Applications, Sep. 2004, pp. 1284-1289.*

(Continued)

*Primary Examiner* — Spencer Patton
(74) *Attorney, Agent, or Firm* — Osha Liang LLP (57) ABSTRACT

A control device of a vehicle lamp includes: a receiving section which receives an acceleration value usable to derive a tilt angle of a vehicle to a horizontal plane, wherein the tilt angle of the vehicle to the horizontal plane is represented as a total angle; and a control section which controls an optical axis adjustment of the vehicle lamp. The control section derives from the total angle a first and a second provisional vehicle posture angles based on a first and a second calculation method, respectively, corrects the first or second provisional vehicle posture angle so that a difference between the first and the second provisional vehicle posture angles becomes small, sets the corrected provisional vehicle posture angle to the vehicle posture angle, and outputs a control signal for instructing the optical axis adjustment of the vehicle lamp according to the vehicle posture angle.

7 Claims, 7 Drawing Sheets

(56) References Cited

FOREIGN PATENT DOCUMENTS

| FR | 2915283 A1 | 10/2008 |
|---|---|---|
| JP | 2000-085459 A | 3/2000 |
| JP | 2000-247178 A | 9/2000 |
| JP | 2001-341578 A | 12/2001 |
| JP | 2004-314856 A | 11/2004 |
| JP | 2006-027300 A | 2/2006 |
| JP | 2009-126268 A | 6/2009 |
| JP | 2010-143424 A | 7/2010 |
| JP | 2010-247551 A | 11/2010 |

OTHER PUBLICATIONS

European Search Report issued in European Application No. 12170453.3 dated Jan. 25, 2013 (7 pages).
Chinese Office Action for Application No. 201210179912.0, mailed on Apr. 14, 2014 (15 pages).
Patent Abstracts of Japan for Japanese Publication No. 2000-085459, publication date Mar. 28, 2000 (1 page).
Patent Abstracts of Japan for Japanese Publication No. 2001-341578, publication date Dec. 11, 2001 (1 page).
Patent Abstracts of Japan for Japanese Publication No. 2004-314856, publication date Nov. 11, 2004 (1 page).
Patent Abstracts of Japan for Japanese Publication No. 2009-126268, publication date Jun. 11, 2009 (1 page).
Notification of Reasons for Refusal issued in corresponding Japanese Application No. 2011-125210, mailed on Feb. 3, 2015 (6 pages).

* cited by examiner

VEHICLE LAMP CONTROL DEVICE AND VEHICLE LAMP SYSTEM

CROSS REFERENCE TO RELATED APPLICATION(S)

The present disclosure relates to the subject matters contained in Japanese Patent Application No. 2011-125210 filed on Jun. 3, 2011, which are incorporated herein by reference in its entirety.

FIELD

One or more embodiments of the present invention relate to a control device of a vehicle lamp and a vehicle lamp system, and more particularly, to a control device of a vehicle lamp and a vehicle lamp system which are used in automobiles or the like.

BACKGROUND

In the related art, an auto-leveling control has been proposed in which an optical axis position of a vehicle headlamp is automatically adjusted according to a tilt angle of a vehicle to change an irradiation direction. Generally, in the auto-leveling control, a vehicle height sensor is used as a tilt detection device of the vehicle. The optical axis position of the headlamp is adjusted based on a pitch angle of the vehicle detected by the vehicle height sensor. In this regard, in JP-A-2000-085459, JP-A-2004-314856, JP-A-2001-341578 and JP-A-2009-126268, a configuration is disclosed in which an acceleration sensor is used as a tilt detection device to perform an auto-leveling control.

In a case where the acceleration sensor is used as the tilt detection device, it is possible to provide an auto-leveling system with a lightweight at a low cost, compared with the case where the vehicle height sensor is used. However, there is a demand that the auto-leveling control should be performed with high accuracy by suppressing an accuracy decrease due to detection errors of the sensor or the like.

SUMMARY

In view of the above, one or more embodiments of the invention provide a technique which is able to enhance accuracy of an auto-leveling control for adjusting the optical axis of a vehicle lamp using an acceleration sensor.

According to one aspect of the embodiments, there is provided a control device of a vehicle lamp. The device includes: a receiving section which receives an acceleration value detected by an acceleration sensor, the acceleration value usable to derive a tilt angle of a vehicle with respect to a horizontal plane, wherein when the tilt angle of the vehicle with respect to the horizontal plane is represented as a total angle, the total angle includes a road surface angle which is a tilt angle of a road surface with respect to the horizontal plane and a vehicle posture angle which is a tilt angle of the vehicle with respect to the road surface; and a control section which controls an optical axis adjustment of the vehicle lamp. The control section derives a first provisional vehicle posture angle from the total angle based on a first calculation method and a second provisional vehicle posture angle based on a second calculation method, corrects one of the first provisional vehicle posture angle and the second provisional vehicle posture angle so that a difference between the first provisional vehicle posture angle and the second provisional vehicle posture angle becomes small, sets the corrected provisional vehicle posture angle to the vehicle posture angle, and outputs a control signal for instructing the optical axis adjustment of the vehicle lamp according to the vehicle posture angle.

According to this aspect, it is possible to enhance accuracy of an auto-leveling control for adjusting the optical axis of the vehicle lamp using the acceleration sensor.

In the aspect, the control section may retain a reference value of the road surface angle and a reference value of the first provisional vehicle posture angle, in the first calculation method, the reference value of the road surface angle may be subtracted from the total angle during vehicle stop to derive the first provisional vehicle posture angle, the derived first provisional vehicle posture angle may be set as a new reference value, the reference value of the first provisional vehicle posture angle is subtracted from the total angle during vehicle stop to derive the road surface angle, and the derived road surface angle may be set as a new reference value, and in the second calculation method, the second provisional vehicle posture angle may be derived from a ratio of a temporal change amount of acceleration in a forward-backward direction of the vehicle and a temporal change amount of acceleration in an up-down direction of the vehicle during at least one of acceleration and deceleration of the vehicle. According to this aspect, it is possible to enhance accuracy of the auto-leveling control for adjusting the optical axis of the vehicle lamp using the acceleration sensor.

In the aspect, the control section may correct the first provisional vehicle posture angle based on the second provisional vehicle posture angle. According to this aspect, it is possible to suppress accumulation of errors occurring as an error component included in the reference value of the road surface angle is included in the first provisional vehicle posture angle and an error component included in the reference value of the first provisional vehicle posture angle is included in the road surface angle.

In the aspect, the control section may generate match data in which a certain total angle and a certain vehicle posture angle may be matched with each other based on a history of the total angle, and may correct at least one of the first provisional vehicle posture angle and the second provisional vehicle posture angle based on the match data when the total angle is the certain total angle. According to this aspect of the invention, it is possible to further enhance accuracy of the auto-leveling control.

According to another aspect of the embodiments, there is provided a vehicle lamp system including: a vehicle lamp configured to adjust an optical axis; an acceleration sensor which detects an acceleration value which is usable to derive a tilt angle of a vehicle with respect to a horizontal plane, wherein when the tilt angle of the vehicle with respect to the horizontal plane is represented as a total angle, the total angle includes a road surface angle which is a tilt angle of a road surface with respect to the horizontal plane and a vehicle posture angle which is a tilt angle of the vehicle with respect to the road surface; and a control device which controls an optical axis adjustment of the vehicle lamp, wherein the control device derives a first provisional vehicle posture angle from the total angle based on a first calculation method and a second provisional vehicle posture angle based on a second calculation method, corrects one of the first provisional vehicle posture angle and the second provisional vehicle posture angle so that a difference between the first provisional vehicle posture angle and the second provisional vehicle posture angle becomes small, sets the corrected provisional vehicle posture angle to the vehicle posture angle, and outputs a control signal for instructing the optical axis adjustment of the vehicle lamp according to the vehicle posture angle.

According to this aspect, it is similarly possible to enhance accuracy of the auto-leveling control for adjusting the optical axis of the vehicle lamp using the acceleration sensor.

According to the embodiments, it is possible to provide a technique by which it is possible to enhance accuracy of the auto-leveling control for adjusting the optical axis of the vehicle lamp using the acceleration sensor.

BRIEF DESCRIPTION OF THE DRAWINGS

A general configuration that implements the various features of the invention will be described with reference to the drawings. The drawings and the associated descriptions are provided to illustrate embodiments of the invention and should not limit the scope of the invention.

DETAILED DESCRIPTION OF THE EMBODIMENTS

Hereinafter, one or more embodiments of the invention will be described with reference to the accompanying drawings. The same reference numerals are given to the same or equivalent components, members and processes shown in the respective figures, and repetitive description thereof will be appropriately omitted. Further, the embodiments are examples which do not limit the invention, all characteristics or combinations described in the embodiments are not necessarily essential in the invention.

First Embodiment

Figure 1:
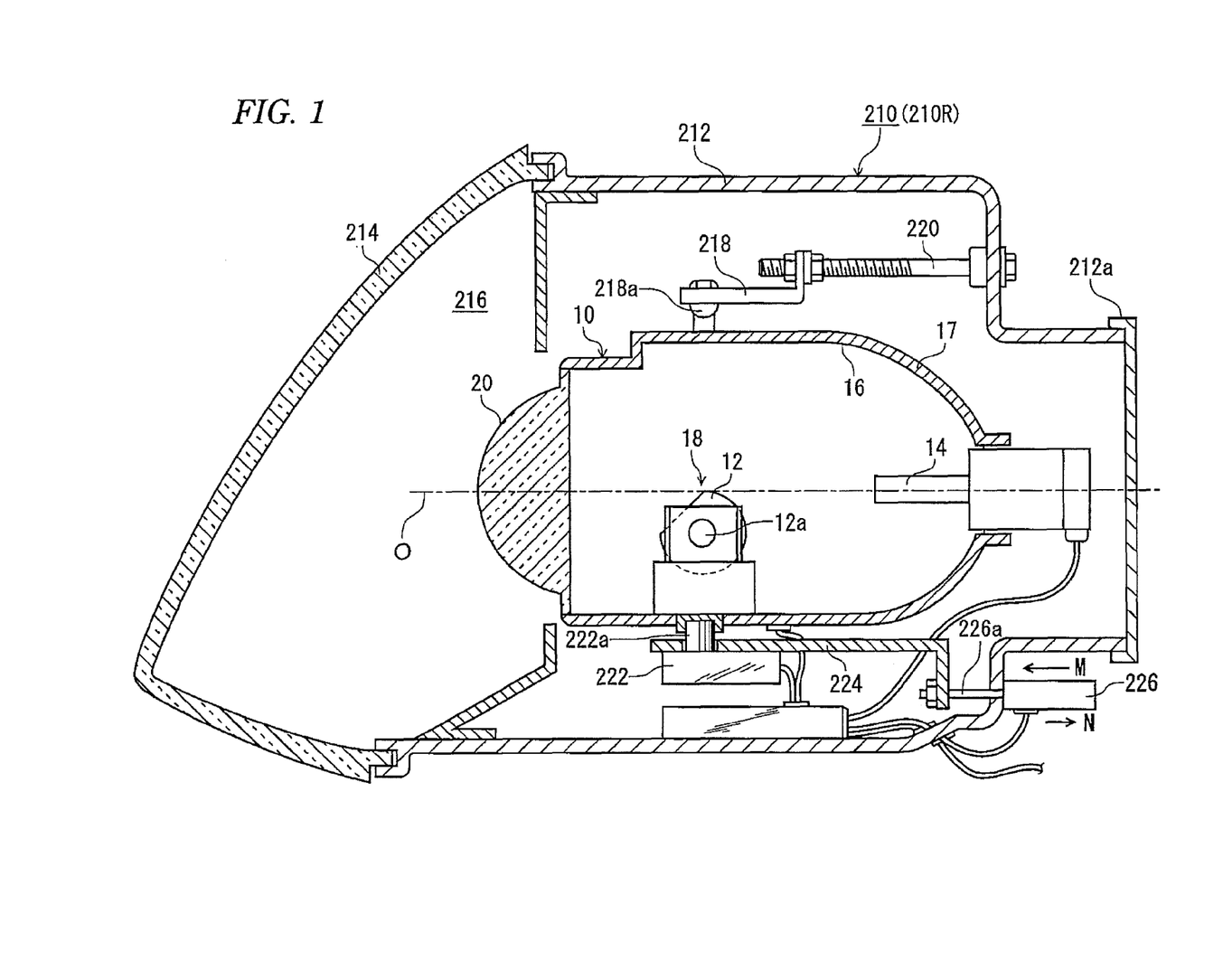
FIG. 1 is a vertical sectional view schematically illustrating a headlamp unit which includes a lamp unit which is a control target of a leveling ECU according to a first embodiment of the invention.

FIG. 1 is a vertical sectional view schematically illustrating a headlamp unit which includes a lamp unit which is a control target of a leveling ECU according to a first embodiment of the invention. A headlamp unit 210 has a structure in which a pair of headlamp units which is horizontally symmetrically formed is respectively disposed in a vehicle width direction on left and right sides thereof. Since the headlamp units disposed on the left and right sides have the substantially same configuration except that they have the horizontally symmetrical structure, a structure of a right headlamp unit 210R will be described, and description about a left headlamp unit 210L will be arbitrarily omitted.

The headlamp unit 210R includes a lamp body 212 which has an opening at a front side of a vehicle, and a light-transmissive cover 214 which covers the opening. The lamp body 212 includes a detachable cover 212a which is capable of being removed to the back side of the vehicle. A lamp chamber 216 is formed by the lamp body 212 and the light-transmissive cover 214. A lamp unit 10 (vehicle lamp) which emits light in front of the vehicle is accommodated in the light chamber 216.

A lamp bracket 218 which includes a pivot mechanism 218a which serves as a center of fluctuation of the lamp unit 10 in the vertical and horizontal directions is formed in the lamp unit 10. The lamp bracket 218 is screw-coupled with an aiming adjustment screw 220 which is rotatably supported on a wall surface of the lamp body 212. Accordingly, the lamp unit 10 is fixed in a certain position in the lamp chamber 216 which is determined according to an adjustment state of the aiming adjustment screw 220, and is capable of being changed to postures such as a front-tilt posture or a back-tilt posture centering around the pivot mechanism 218a with reference to the certain position. Further, a rotation shaft 222a of a swivel actuator 222 is fixed to a lower surface of the lamp unit 10. The swivel actuator 222 is fixed to a unit bracket 224.

A leveling actuator 226 which is disposed outside the lamp body 212 is connected to the unit bracket 224. The leveling actuator 226 is configured by a motor or the like which extends and retracts a rod 226a, for example, in arrow directions M and N. In a case where the rod 226a extends in the arrow direction M, the lamp unit 10 fluctuates to have the back-tilt posture centering around the pivot mechanism 218a. On the other hand, in a case where the rod 226a is retracted in the arrow direction N, the lamp unit 10 fluctuates to have the front-tilt posture centering around the pivot mechanism 218a. When the lamp unit 10 is in the back-tilt posture, a leveling adjustment can be performed so that a pitch angle of an optical axis O, that is, an angle of the optical axis O in the vertical direction is directed upward. Further, when the lamp unit 10 is in the front-tilt posture, a leveling adjustment can be performed so that the pitch angle of the optical axis O is directed downward.

The lamp unit 10 may include an aiming adjustment mechanism. For example, in a portion where the rod 226a of the leveling actuator 226 is connected to the unit bracket 224, an aiming pivot mechanism (not shown) which serves as a fluctuation center in the aiming adjustment is disposed. Further, in the lamp bracket 218, the aiming adjustment screws 220 as mentioned above may be disposed at intervals in the vehicle width direction. Further, by rotating two aiming adjustment screws 220, the lamp unit 10 may be turned in the vertical and horizontal directions centering around the aiming pivot mechanism, to thereby adjust the optical axis O in the vertical and horizontal directions.

The light unit 10 includes a shade mechanism 18 which includes a rotation shade 12, a bulb 14 which is a light source, a lamp housing 17 which supports a reflector 16 on an inner wall thereof, and a projection lens 20. The bulb 14 may employ an incandescent lamp, a halogen lamp, a radiation lamp or an LED, for example. In the present embodiment, an example in which the bulb 14 is configured by the halogen lamp is shown. The reflector 16 reflects light emitted from the bulb 14. Part of the light from the bulb 14 and the light reflected in the reflector 16 is guided to the projection lens 20 through the rotation shade 12.

The rotation shade 12 is a cylindrical member which is capable of being rotated centering around a rotation shaft 12a, and includes a notch section which is partly cut in the axial direction and plural shade blades (not shown). Any one of the notch section or the shade blades is moved on the optical axis O, and thus, a certain light distribution pattern is formed. The reflector 16 has an elliptic spherical surface shape in at least a part thereof, and the elliptic spherical surface is set so that the shape of the cross-section which includes the optical axis O of the lamp unit 10 becomes at least a part of the elliptic shape. The portion of the elliptic spherical surface shape of the reflector 16 has a first focus at an approximate center of the bulb 14, and a second focus on a backward focal plane of the projection lens 20.

The projection lens 20 is disposed on the optical axis O which extends in the forward-backward direction of the vehicle. The bulb 14 is disposed on the back side with reference to the backward focal plane which is a focal plane including a backward focus of the projection lens 20. The projection lens 20 is a plano-convex aspheric lens of which the forward surface is a convex surface and the backward surface is a flat surface, and projects a light source image formed on the backward focal plane on a virtual vertical screen in front of the lamp as an inverted image. The configuration of the lamp unit 10 is not particularly limited thereto, and it may be a reflective lamp unit or the like which does not include the projection lens 20.

Figure 2:
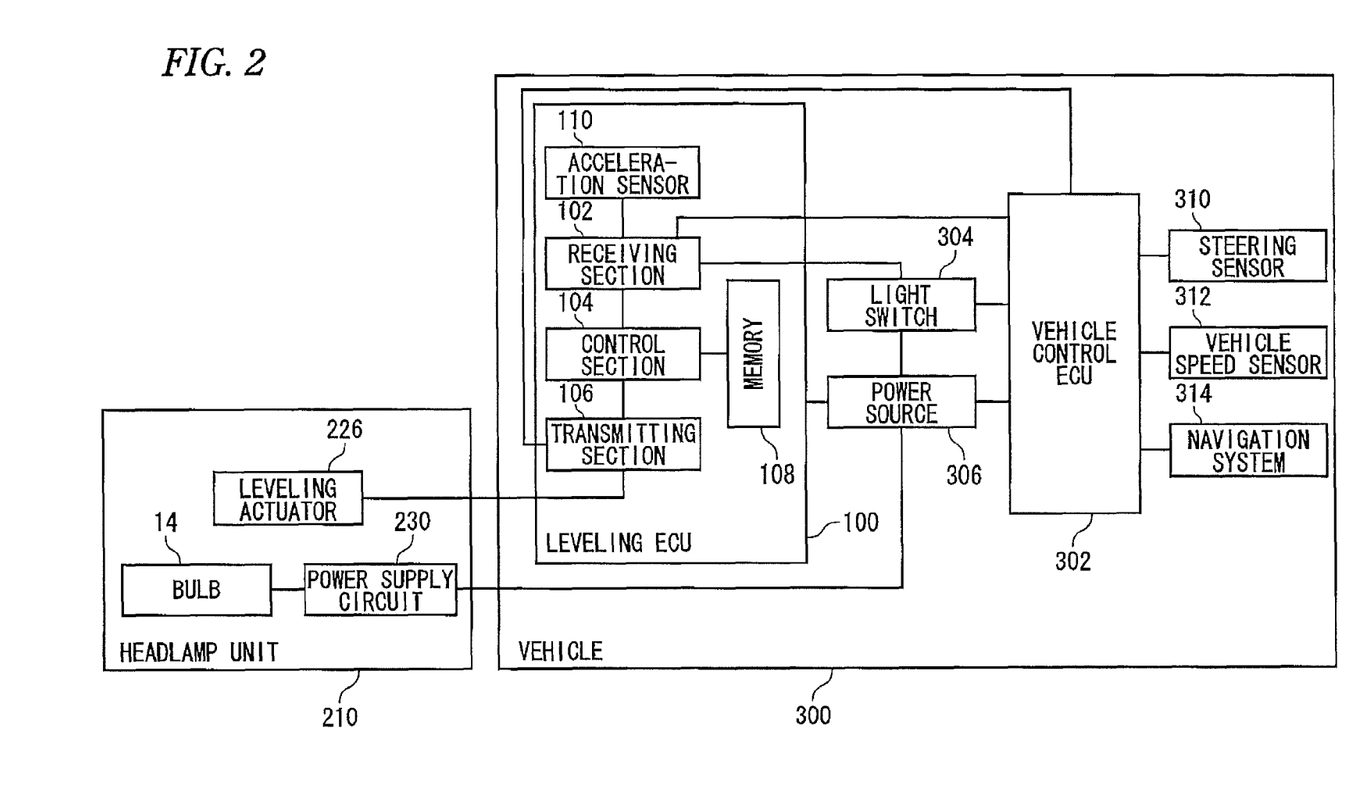
FIG. 2 is a functional block diagram illustrating operation linking of a headlamp unit, a vehicle control ECU and a leveling ECU.

FIG. 2 is a functional block diagram illustrating the operational linking of a headlamp unit, a vehicle control ECU and a leveling ECU. Since the configuration of the right headlamp unit 210R and the left headlamp unit 210L are substantially the same as described above, the headlamp unit 210R and the headlamp unit 210L are simply referred to as the headlamp 210 in FIG. 2. Further, the leveling ECU 100 is realized by an element or a circuit including a CPU or a memory of a computer as a hardware configuration, and is realized by a computer program or the like as a software configuration. In FIG. 2, a functional block which is realized by a link of the above configurations is shown. Accordingly, it is understandable by those skilled in the art that the functional block may be realized in a variety of patterns by combinations of hardware and software.

The leveling ECU 100 (vehicle lamp control device) includes a receiving section 102, a control section 104, a transmitting section 106, a memory 108, and an acceleration sensor 110. The leveling ECU 100 is installed in the vicinity of a dashboard of a vehicle 300, for example. The installation position of the leveling ECU 100 is not particularly limiting, and may be installed inside the headlamp unit 210, for example. Further, the acceleration sensor 110 may be installed outside the leveling ECU 100. A vehicle control ECU 302 or a light switch 304 mounted on the vehicle 300 is connected to the leveling ECU 100. A signal output from the vehicle control ECU 302 or the light switch 304 is received by the receiving section 102. Further, the receiving section 102 receives an output value of the acceleration sensor 110.

A steering sensor 310, a vehicle speed sensor 312, a navigation system 314 and the like are connected to the vehicle control ECU 302, and the vehicle control ECU 302 may receive a variety of information from these sensors and the like and may transmit the information to the leveling ECU 100 or the like. For example, the vehicle control ECU 302 transmits an output value of the vehicle speed sensor 312 to the leveling ECU 100. According to this configuration, the leveling ECU 100 can detect a traveling state of the vehicle 300.

The light switch 304 transmits a signal instructing turn-on or turn-off of the headlamp unit 210, a signal indicating a light distribution pattern formed by the headlamp unit 210, a signal instructing execution of an auto-leveling control, or the like, to a power source 306, the vehicle control ECU 302, the leveling ECU 100 or the like, according to operation content of a driver. For example, the light switch 304 transmits the signal instructing execution of the auto-leveling control to the leveling ECU 100. Thus, the leveling ECU 100 starts the auto-leveling control.

The signal received by the receiving section 102 is transmitted to the control section 104. The control section 104 derives a change in the tilt angle of the vehicle 300 based on the output value of the acceleration sensor 110 transmitted from the receiving section 102 and information retained in the memory 108 as necessary, and generates a control signal instructing optical axis adjustment of the lamp unit 10. The control section 104 outputs the generated control signal to the leveling actuator 226 through the transmitting section 106. The leveling actuator 226 is driven based on the received control signal, and thus, the optical axis O of the lamp unit 10 is adjusted in the vertical direction of the vehicle (pitch angle direction).

The power source 306 which supplies electric power to the leveling ECU 100, the vehicle control ECU 302 and the headlamp unit 210 is mounted on the vehicle 300. If turn-on of the headlamp unit 210 is instructed by operation of the light switch 304, electric power is supplied to the bulb 14 from the power source 306 through a power source circuit 230.

Figure 3:
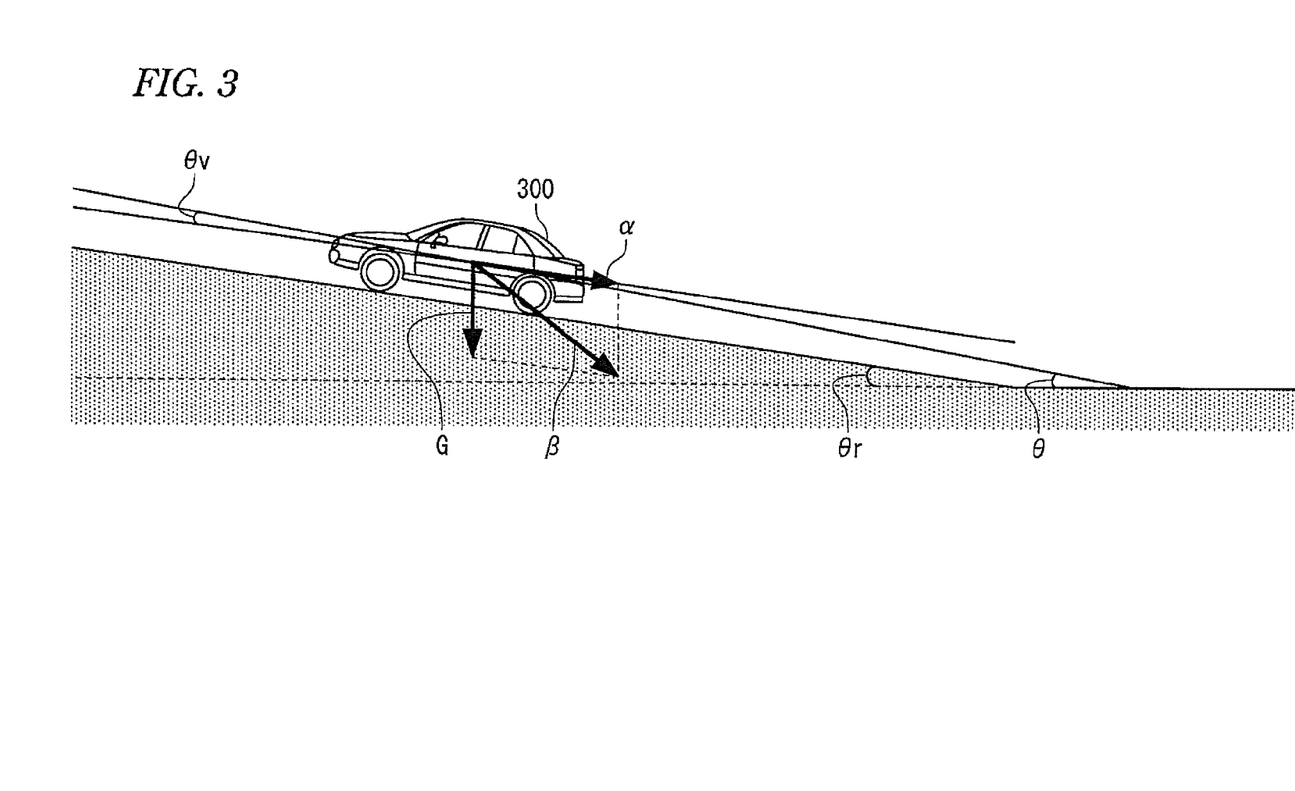
FIG. 3 is a schematic diagram illustrating an acceleration vector occurring in a vehicle and a tilt angle of a vehicle capable of being detected by an acceleration sensor.
Figure 4A:
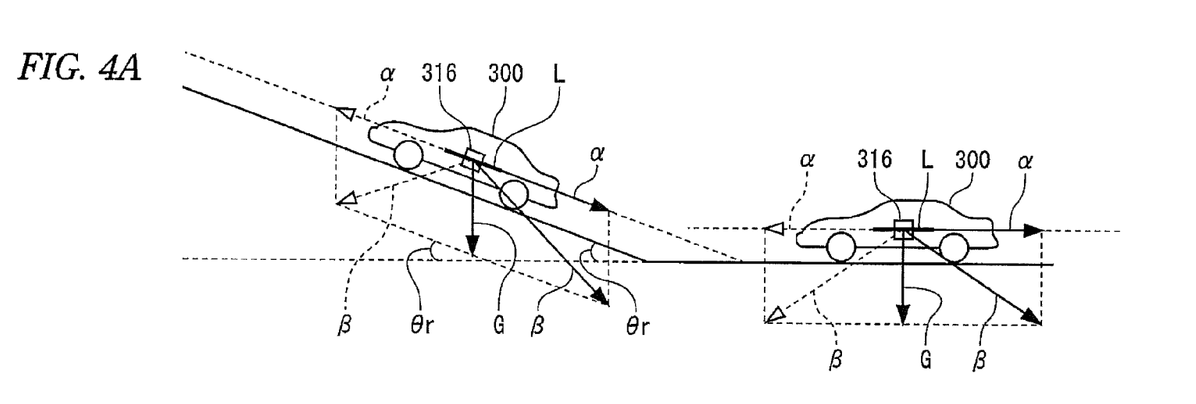
FIGS. 4A and 4B are schematic diagrams illustrating the relationship between a direction of a vehicle movement acceleration vector and a second provisional vehicle posture angle.
Figure 4B:
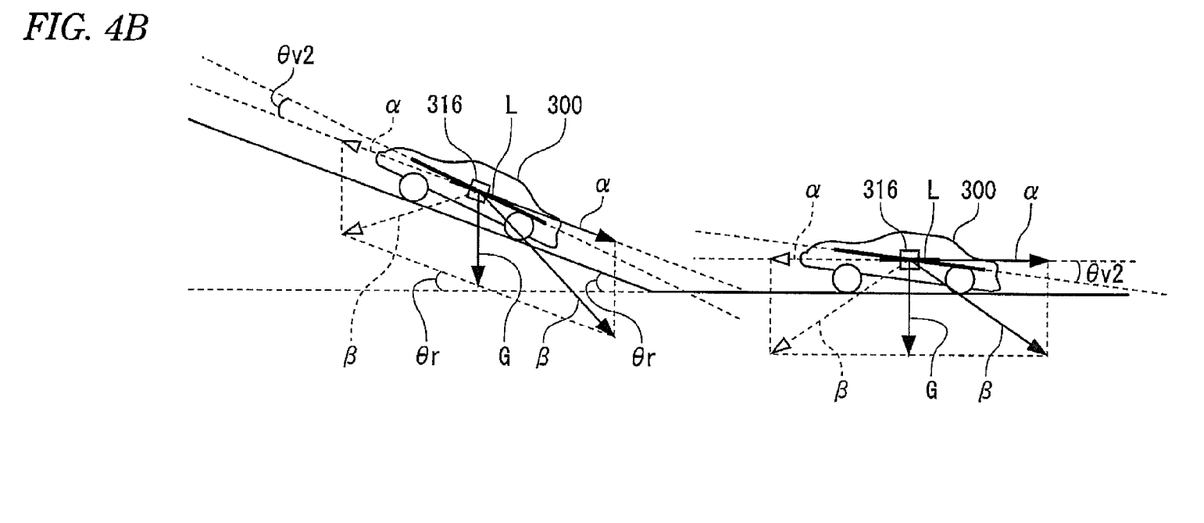
Figure 5:
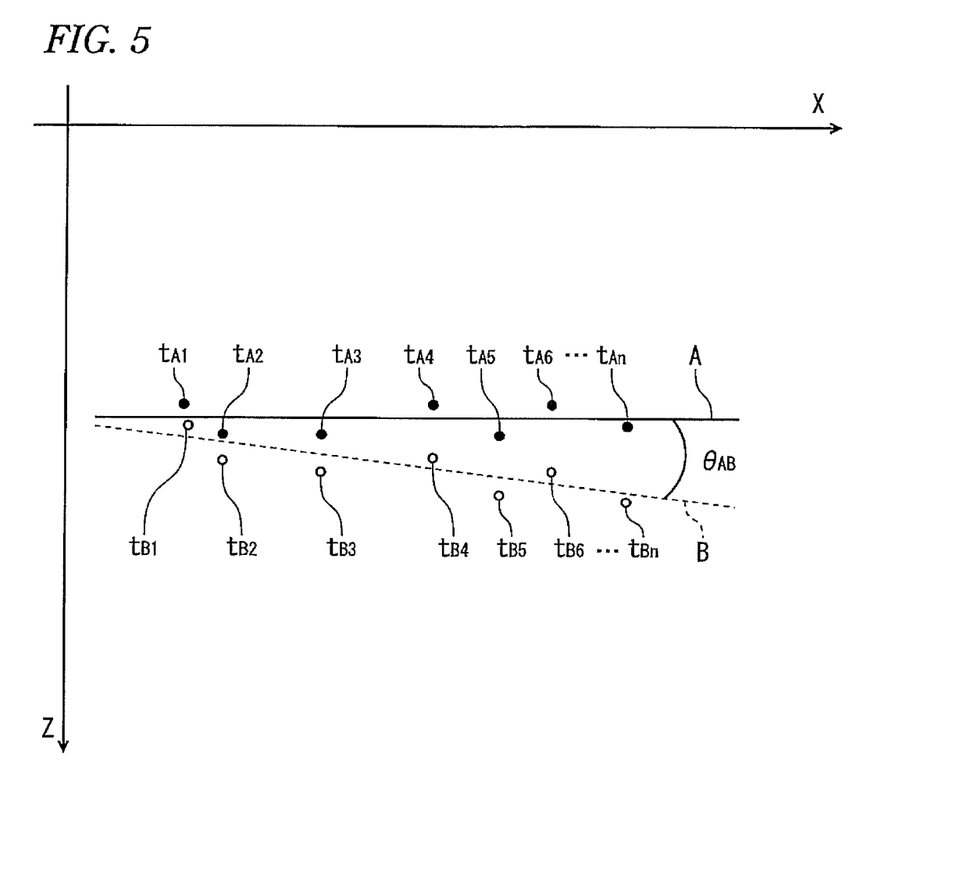
FIG. 5 is a graph illustrating the relationship between acceleration in a forward-backward direction of a vehicle and acceleration in an up-down direction of a vehicle.

Subsequently, the auto-leveling control through the leveling ECU 100 having the above-mentioned configuration will be described in detail. FIG. 3 is a schematic diagram illustrating an acceleration vector occurring in a vehicle and a tilt angle of a vehicle capable of being detected by an acceleration sensor. FIGS. 4A and 4B are schematic diagrams illustrating the relationship between a direction of a vehicle movement acceleration vector and a second provisional vehicle posture angle, in which FIG. 4A shows a state where the second provisional vehicle posture angle θv2 (which will be described later) is not changed, and FIG. 4B shows a state where the second provisional vehicle posture angle θv2 is changed. Further, in FIGS. 4A and 4B, a movement acceleration vector α and a resultant acceleration vectors β occurring when the vehicle 300 is accelerated are indicated by solid line arrows, and a movement acceleration vector α and a resultant acceleration vector β occurring when the vehicle 300 is decelerated are indicated by broken line arrows. FIG. 5 is a graph illustrating the relationship between acceleration in a forward-backward direction of a vehicle and acceleration in an up-down direction of a vehicle.

For example, in a case where a luggage is loaded in a cargo at the back of the vehicle or a person or the like is on a back seat, the posture of the vehicle becomes a back-tilt posture, and in a case where the luggage is unloaded or the person who is on the back seat gets off, the vehicle posture is changed from the back-tilt posture state to a front-tilt posture. The irradiation direction of the lamp unit 10 is changed vertically according to the posture of the vehicle 300, and thus, the front irradiation distance is increased or decreased. Thus, the leveling ECU 100 derives a change in the tilt angle of the vehicle in the pitch direction from the output value of the acceleration sensor 110, and controls the leveling actuator 226 to set the pitch angle of the optical axis O to an angle according to the vehicle posture. In this way, by realizing the auto-leveling control in which the leveling adjustment of the lamp unit 10 is performed in real time based on the vehicle posture, even though the vehicle posture is changed, it is possible to optimally adjust the range of the front irradiation.

Here, the acceleration sensor 110 is a triaxial acceleration sensor which includes an X axis, a Y axis and a Z axis which are orthogonal to each other, for example. The acceleration sensor 110 is installed in the vehicle 300 in an arbitrary posture, and detects an acceleration vector occurring in the vehicle 300. A gravitational acceleration and a movement acceleration due to the movement of the vehicle 300 occur in the vehicle 300 during traveling. Thus, as shown in FIG. 3, the acceleration sensor 110 can detect the resultant acceleration vector β obtained by synthesizing the gravitational acceleration vector G and the movement acceleration vector α. Further, while the vehicle 300 is being stopped, the acceleration sensor 110 can detect the gravitational acceleration vector G. The acceleration sensor 110 outputs numerical values of respective axis components of the detected acceleration vector. The numerical values of the respective components of the X axis, the Y axis and the Z axis output from the acceleration sensor 110 are converted into components of a forward-backward axis, a left-right axis and a vertical axis of the vehicle 300 by the control section 104.

The tilt of the vehicle 300 with respect to the gravitational acceleration vector G may be derived from the output value of the acceleration sensor 110. That is, a total angle θ which is a tilt angle of the vehicle with respect to the horizontal plane, which includes a road surface angle θr which is a tilt angle of a road surface with respect to the horizontal plane and a vehicle posture angle θv which is a tilt angle of the vehicle with respect to the road surface, may be derived from the acceleration detected by the acceleration sensor 110. The road surface angle θr, the vehicle posture angle θv, and the total angle θ are respectively angles of the forward-backward axis of the vehicle 300 in the vertical direction, in other words, angles of the vehicle 300 in the pitch direction.

The above-mentioned auto-leveling control is performed for the purpose of absorbing a change in the front irradiation distance of the vehicle lamp based on a change in the tilt angle of the vehicle to optimally maintain the front range of the irradiation light. Accordingly, the tilt angle of the vehicle which is necessary for the auto-leveling control is the vehicle posture angle θv. Thus, in the auto-leveling control using the acceleration sensor 110, it is necessary to extract the vehicle posture angle θv or the change in the vehicle posture angle θv from the total angle θ or the change in the total angle θ.

On the other hand, the control section 104 of the leveling ECU 100 according to the present embodiment derives a first provisional vehicle posture angle θv1 based on a first calculation method from the total angle θ. Further, the control section 104 derives a second provisional vehicle posture angle θv2 based on a second calculation method from the total angle θ or the output value of the acceleration value 110. Further, the control section 104 corrects one of the first provisional vehicle posture angle θv1 and the second provisional vehicle posture angle θv2 so that the difference between the first provisional vehicle posture angle θv1 and the second provisional vehicle posture angle θv2 is reduced, sets the corrected provisional vehicle posture angle to the vehicle posture angle θv, and outputs a control signal instructing the optical axis adjustment of the lamp unit 10 according to the vehicle posture angle θv.

(First Calculation Method)

For example, the control section 104 derives the first provisional vehicle posture angle θv1 by the first calculation method as described below. The first calculation method is a method of estimating the change in the total angle θ during vehicle traveling as a change in the road surface angle θr, and estimating a change in the total angle θ during vehicle stop as a change in the vehicle posture angle θv to derives the first provisional vehicle posture angle θv1 from the total angle θ. During vehicle traveling, since the vehicle posture angle θv is hardly changed due to increase or decrease of the weight of load or the number of passengers, it is possible to estimate the change in the total angle θ during vehicle traveling as the change in the road surface angle θr. Further, during vehicle stop, since the road surface angle θr is hardly changed due to movement of the vehicle 300, the change in the total angle θ during vehicle stop may be estimated as the change in the vehicle posture angle θv.

For example, firstly, in a manufacturing factory of a vehicle maker, a repair shop of a dealer, or the like, the vehicle 300 is disposed on the horizontal plane to be in a reference state. In the reference state, the vehicle 300 is in a state where one passenger is in a driving seat, for example. Further, an initialization signal is transmitted to the leveling ECU 100 by a switch operation or the like of an initialization device. If the initialization signal is received through the receiving section 102, the control section 104 starts an initial aiming adjustment and matches the optical axis O of the lamp unit 10 with an initial setting position. Further, the control section 104 records an output value of the acceleration sensor 110 when the vehicle 300 is in the reference state as a reference value of the road surface angle θr (θr=0°) and a reference value of the first provisional vehicle posture angle θv1 (θv1=0°) in the memory 108, to thereby retain these reference values.

In a state where the vehicle 300 is actually used, the control section 104 subtracts the reference value of the first provisional vehicle posture angle θv1 from the current (when the vehicle is stopped) total angle θ when the vehicle is stopped to derive the road surface angle θr. Further, the derived road surface angle θr is retained as a new reference value in the memory 108. Thus, the change in the total angle θ during vehicle traveling which is estimated as the change in the road surface angle θr is set to the reference value of the road surface angle θr. Here, the expression "during vehicle traveling" represents a time period from the time when the detection value of the vehicle speed sensor 312 exceeds 0 to the time when the detection value of the vehicle speed sensor 312 becomes 0, for example. Further, the expression "when the vehicle is stopped" represents the time when the detection value of the acceleration sensor 110 is stabilized after the detection value of the vehicle speed sensor 312 becomes 0, for example. The "during vehicle traveling" and the "when the vehicle is stopped" may be appropriately set based on an experiment or a simulation through a designer.

During vehicle stop, the control section 104 subtracts the reference value of the road surface angle θr from the current total angle θ to derive the first provisional vehicle posture angle θv1. Further, the derived first provisional vehicle posture angle θv1 is retained in the memory 108 as a new reference value. The "during vehicle stop" represents a time period from the time when the detection value of the acceleration sensor 110 is stabilized to the time when the detection value of the vehicle speed sensor 312 exceeds 0, for example. The "during vehicle stop" may be appropriately set based on an experiment or a simulation through a designer.

(Second Calculation Method)

Normally, the vehicle 300 is moved in parallel with the road surface. Accordingly, the movement acceleration vector α becomes a vector which is in parallel with the road surface, irrespective of the vehicle posture. Further, as shown in FIG. 4A, in a case where the vehicle posture is parallel with the road surface, in other words, in a case where the second provisional vehicle posture angle θv2 is 0', since the forward-backward axis L of the vehicle 300 is parallel with the road surface, the movement acceleration vector α becomes a vector which is in parallel with the forward-backward axis L. Accordingly, a trace of a tip end of the resultant acceleration vector β when the size of the movement acceleration vector α is changed by the acceleration of the vehicle 300 becomes a straight line which is parallel with the forward-backward axis L of the vehicle 300.

On the other hand, as shown in FIG. 4B, in a case where the vehicle posture is tilted by the second provisional vehicle posture angle θv2, in other words, in a case where the second provisional vehicle posture angle θv2 is not 0', since the forward-backward axis L of the vehicle 300 shifts to be tilted with respect to the road surface, the movement acceleration vector α becomes a vector which extends to be tilted with respect to the forward-backward axis L. Accordingly, the trace of the tip end of the resultant acceleration vector β when the size of the movement acceleration vector α is changed by the acceleration of the vehicle becomes a straight line which is tilted with respect to the forward-backward axis L.

Thus, in the second calculation method, the control section 104 derives the second provisional vehicle posture angle θv2 as follows, using the acceleration (forward-backward axis component) in the forward-backward direction and the acceleration (vertical axis component) in the up-down direction of the vehicle 300 which are obtained from the acceleration detected by the acceleration sensor 110. That is, for example, firstly, the vehicle 300 is in the above-mentioned reference state, and then, is accelerated or decelerated in this state. The control section 104 obtains the acceleration in the vehicle forward-backward direction and the acceleration in the vehicle up-down direction from the detection value of the acceleration sensor 110 as an initialization process, and calculates the ratio of the temporal change amount of the acceleration in the vehicle forward-backward direction and the temporal change amount of the acceleration in the vehicle up-down direction in at least one of acceleration or deceleration of the vehicle 300. Further, the control section 104 records the obtained ratio as a reference value in the memory 108.

In a state where the vehicle 300 is actually used, the control section 104 calculates the ratio of the temporal change amount of the acceleration in the vehicle forward-backward direction and the temporal change amount of the acceleration in the vehicle up-down direction, in at least one of acceleration or deceleration of the vehicle 300. Further, the control section 104 derives the second provisional vehicle posture angle θv2 from a reference value of the ratio recorded in advance in the initialization process and the ratio in the current vehicle.

For example, as shown in FIG. 5, the control section 104 plots with time the detection value of the acceleration sensor 110 when the vehicle 300 in the reference state is accelerated or decelerated, in coordinates where the acceleration of the vehicle in the forward-backward direction is set on a first axis (x axis) and the acceleration of the vehicle in the up-down direction is set on a second axis (z axis). Points $t_{A1}$ to $t_{An}$ are detection values of the acceleration sensor 110 at times $t_1$ to $t_n$ when the vehicle 300 is in the reference state. Further, the control section 104 sets the ratio of tilts of straight lines or vectors obtained from at least two points to the reference value of the ratio. In the present embodiment, the control section 104 calculates a straight-line approximation A by a least square method or the like with respect to the plural plotted points $t_{A1}$ to $t_{An}$, and sets the tilt of the straight-line approximation A to the reference value of the ratio.

Further, the control section 104 plots the detection value of the acceleration sensor 110 at the time when the vehicle 300 is accelerated or decelerated under an actual usage, for example, when the vehicle 300 starts moving or is stopped, in the above-mentioned coordinates with time. Points $t_{B1}$ to $t_{Bn}$ are detection values of the acceleration sensor 110 at the times $t_1$ to $t_n$ in a state where the vehicle 300 is tilted by the second provisional vehicle posture angle θv2 under an actual usage, as shown in FIG. 4B, for example. The control section 104 similarly calculates a straight-line approximation B with respect to the plural plotted points $t_{B1}$ to $t_{Bn}$ and sets the tilt of the straight-line approximation B to the current ratio under the usage state.

The straight-line approximation B obtained in a state where the vehicle 300 is tilted by the second provisional vehicle posture angle θv2 is tilted by the second provisional vehicle posture angle θv2 with respect to the straight-line approximation A obtained in the reference state. That is, an angle (θAB in FIG. 5) formed by the straight-line approximation A and the straight-line approximation B becomes the second provisional vehicle posture angle θv2. Accordingly, the control section 104 can obtain the second provisional vehicle posture angle θv2 from the tilts of two straight-line approximations.

After the first and second provisional vehicle posture angles θv1 and θv2 are obtained, the control section 104 corrects the first provisional vehicle posture angle θv1 based on the second provisional vehicle posture angle θv2. For example, the control section 104 calculates a difference Δθv between the first provisional vehicle posture angle θv1 and the second provisional vehicle posture angle θv2, and corrects the first provisional vehicle posture angle θv1 so that the first provisional vehicle posture angle θv1 is close to the second provisional vehicle posture angle θv2 by a correction value Δθc which is smaller than the difference Δθv. Further, the control section 104 sets the corrected first provisional vehicle posture angle θv1 to the vehicle posture angle θv for use in the optical axis adjustment, and performs the optical axis adjustment according to the vehicle posture angle θv.

In the first calculation method, the reference value of the first provisional vehicle posture angle θv1 is subtracted from the total angle θ to calculate the road surface angle θr, and the reference value of the road surface angle θr is subtracted from the total angle θ to calculate the first provisional vehicle posture angle θv1. Accordingly, in this method, since an error component included in the reference value of the road surface angle θr is included in the first provisional vehicle posture angle θv1 and an error component included in the reference value of the first provisional vehicle posture angle θv1 is included in the road angle θr, the errors may be accumulated. In this regard, in the present embodiment, the second provisional vehicle posture angle θv2 is calculated by the second calculation method which is different from the first calculation method, and the first provisional vehicle posture angle θv1 is corrected using the second provisional vehicle posture angle θv2. Further, since the road surface angle θr is calculated using the first provisional vehicle posture angle θv1 which is corrected using the second provisional vehicle posture angle θv2, the road surface angle θr is consequently corrected using the second provisional vehicle posture angle θv2. Thus, it is possible to suppress accumulation of the above-mentioned errors, and it is thus possible to reduce accuracy deterioration of the auto-leveling control.

The road surface angle θr may be calculated using the first provisional vehicle posture angle θv1 (reference value of the first provisional vehicle posture angle θv1) which is corrected using the second provisional vehicle posture angle θv2, the first provisional vehicle posture angle θv1 may be calculated using the road surface angle θr (reference value of the road surface angle θr), and the optical axis adjustment may be performed using the first provisional vehicle posture angle θv1 as the vehicle posture angle θv. Further, the road surface angle θr may be corrected using the second provisional vehicle posture angle $\theta v2$, the corrected road surface angle $\theta r$ (reference value of the road surface angle $\theta r$) is subtracted from the total angle $\theta$ to calculate the first provisional vehicle posture angle $\theta v1$, and the optical axis adjustment may be performed using the first provisional vehicle posture angle $\theta v1$ as the vehicle posture angle $\theta v$. As a method of correcting the road surface angle $\theta r$ using the second provisional vehicle posture angle $\theta v2$, for example, a method may be used in which the second provisional vehicle posture angle $\theta v2$ is subtracted from the total angle $\theta$ to calculate a road surface angle $\theta r2$ and the road angle $\theta r$ (reference value of the road surface angle $\theta r$) is corrected using the road surface angle $\theta r2$. These cases are included in a case where the first provisional vehicle posture angle $\theta v1$ is corrected based on the second provisional vehicle posture angle $\theta v2$ and the optical axis adjustment is performed using the corrected first provisional vehicle posture angle $\theta v1$ as the vehicle posture angle $\theta v$.

(Learning from Traveling History)

There is a possibility in that an error due to a detection error or the like of the acceleration sensor 110 is included in the second provisional vehicle posture angle $\theta v2$ calculated by the second calculation method. Thus, the control section 104 periodically receives an acceleration value from the acceleration sensor 110 to retain the total angle $\theta$ corresponding to a certain period, and generates match data in which a certain total angle $\theta$ and a certain vehicle posture angle $\theta v$ are matched with each other based on a history of the total angle $\theta$.

For example, since it is considered that the vehicle posture and the road surface are parallel to each other in the most usage states of the vehicle 300, the "certain total angle $\theta$" becomes the most frequent angle (hereinafter, this angle is appropriately referred to as the most frequent angle) in the history of the total angle $\theta$, and the "certain vehicle posture angle $\theta v$" becomes 0'. Further, for example, after the vehicle 300 is manufactured, the total angle $\theta$ which is firstly recorded by the control section 104 may be set to the "certain total angle $\theta$", and the "certain vehicle posture angle $\theta v$" may be set to 0'. Further, for example, the "certain total angle $\theta$" may be set to the greatest angle in the history of the total angle $\theta$, and the "certain vehicle posture angle $\theta v$" may be set to a value of the greatest vehicle posture angle $\theta v$ capable of being obtained by the vehicle 300.

Further, the control section 104 corrects the second provisional vehicle posture angle $\theta v2$ when the total angle $\theta$ obtained from the detection value of the acceleration sensor 110 is the certain total angle $\theta$, based on the generated match data. For example, in a case where match data in which the most frequent angle and the vehicle posture angle $\theta v=0°$ are matched with each other is generated, the control section 104 corrects the reference value of the second provisional vehicle posture angle $\theta v2$ recorded in the memory 108 to be close to 0° when the current total angle $\theta$ is the most frequent angle. In this way, by learning the relationship between the total angle $\theta$ and the vehicle posture angle $\theta v$ from the traveling history of the vehicle 300 and by correcting the second provisional vehicle posture angle $\theta v2$ based on the learned result, it is possible to enhance the accuracy of the auto-leveling control.

The control section 104 may obtain vehicle information such as a vehicle speed or a steering angle from the vehicle control ECU 302, and may include the information in the traveling history to create match data. Thus, it is possible to create match data with high accuracy. Further, the control section 104 may correct the second provisional vehicle posture angle $\theta v2$ based on the first provisional vehicle posture angle $\theta v1$, and may set the corrected second provisional vehicle posture angle $\theta v2$ as the vehicle posture angle $\theta v$ for use in the optical axis adjustment. Further, the control section 104 may correct the first provisional vehicle posture angle $\theta v1$ or both of the first provisional vehicle posture angle $\theta v1$ and the second provisional vehicle posture angle $\theta v2$, based on the generated match data.

Figure 6:
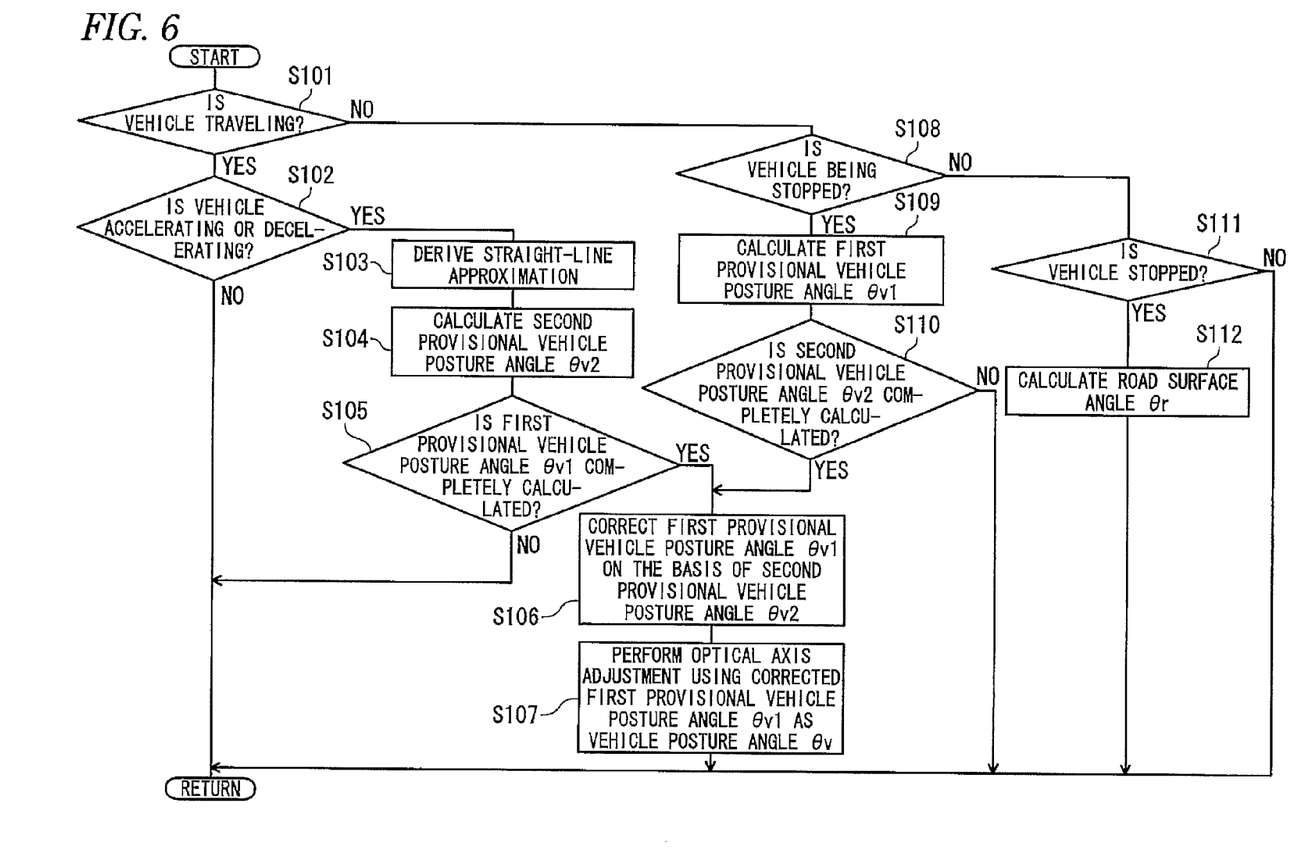
FIG. 6 is a flowchart illustrating an auto-leveling control performed by the leveling ECU according to the first embodiment.

FIG. 6 is a flowchart illustrating an auto-leveling control executed by the leveling ECU according to the first embodiment. In the flowchart of FIG. 6, the processing flow of the respective sections is represented by combination of "S" (the first letter of "Step") which indicates a step and a numeral. This flow is repeatedly performed at a certain timing by the control section 104 in a case where ignition is turned on, in a state where an execution instruction of an auto-leveling control mode is given by the light switch 304, for example. Further, the flow is terminated in a case where ignition is turned off.

The control section 104 determines whether the vehicle is traveling (S101). In a case where the vehicle is traveling (Y of S101), the control section 104 determines whether the vehicle 300 is accelerated or decelerated (S102). The acceleration and deceleration of the vehicle 300 may be detected from detection values of the acceleration sensor 110, the presence or absence of step-on of an accelerator pedal or a brake pedal (not shown), or the like. In a case where the vehicle 300 is not accelerated or decelerated (N of S102), the control section 104 terminates the routine.

In a case where the vehicle 300 is accelerated or decelerated (Y of S102), the control section 104 derives a straight-line approximation from the plural output values of the acceleration sensor 110 (S103). Further, the control section 104 calculates the second provisional vehicle posture angle $\theta v2$ from the straight-line approximation under the reference state which is recorded in advance and the derived straight-line approximation (S104). Then, the control section 104 determines whether the first provisional vehicle posture angle $\theta v1$ is completely calculated (S105). In a case where the first provisional vehicle posture angle $\theta v1$ is not calculated (N of S105), the control section 104 terminates the routine. In a case where the first provisional vehicle posture angle $\theta v1$ is calculated (Y of S105), the control section 104 corrects the first provisional vehicle posture angle $\theta v1$ based on the second provisional vehicle posture angle $\theta v2$ (S106), and performs the optical axis adjustment using the corrected first provisional vehicle posture angle $\theta v1$ as the vehicle posture angle $\theta v$ (S107), and then terminates the routine.

In a case where the vehicle is not traveling (N of S101), the control section 104 determines whether the vehicle is being stopped (S108). In a case where the vehicle is being stopped (Y of S108), the control section 104 subtracts the reference value of the road surface angle $\theta r$ from the total angle $\theta$ to calculate the first provisional vehicle posture angle $\theta v1$ (S109). The reference value of the first provisional vehicle posture angle $\theta v1$ is updated to the calculated first provisional vehicle posture angle $\theta v1$. Thereafter, the control section 104 determines whether the second provisional vehicle posture angle $\theta v2$ is completely calculated (S110). In a case where the second provisional vehicle posture angle $\theta v2$ is not calculated (N of S110), the control section 104 terminates the routine. In a case where the second provisional vehicle posture angle $\theta v2$ is calculated (Y of S110), the control section 104 corrects the first provisional vehicle posture angle $\theta v1$ based on the second provisional vehicle posture angle $\theta v2$ (S106), performs the optical axis adjustment using the corrected first provisional vehicle posture angle $\theta v1$ as the vehicle posture angle $\theta v$ (S107), and then terminates the routine.

In a case where the vehicle is not being stopped (N of S108), the control section 104 determines whether the vehicle is stopped (S111). In a case where the vehicle is not stopped (N of S111), the control section 104 terminates the routine. In a case where the vehicle is stopped (Y of S111), the control section 104 subtracts the reference value of the first provisional vehicle posture angle θv1 from the total angle θ to calculate the road surface angle θr (S112). The reference value of the road surface angle θr is updated to the calculated road surface angle θr. Further, the control section 104 terminates the routine.

Figure 7:
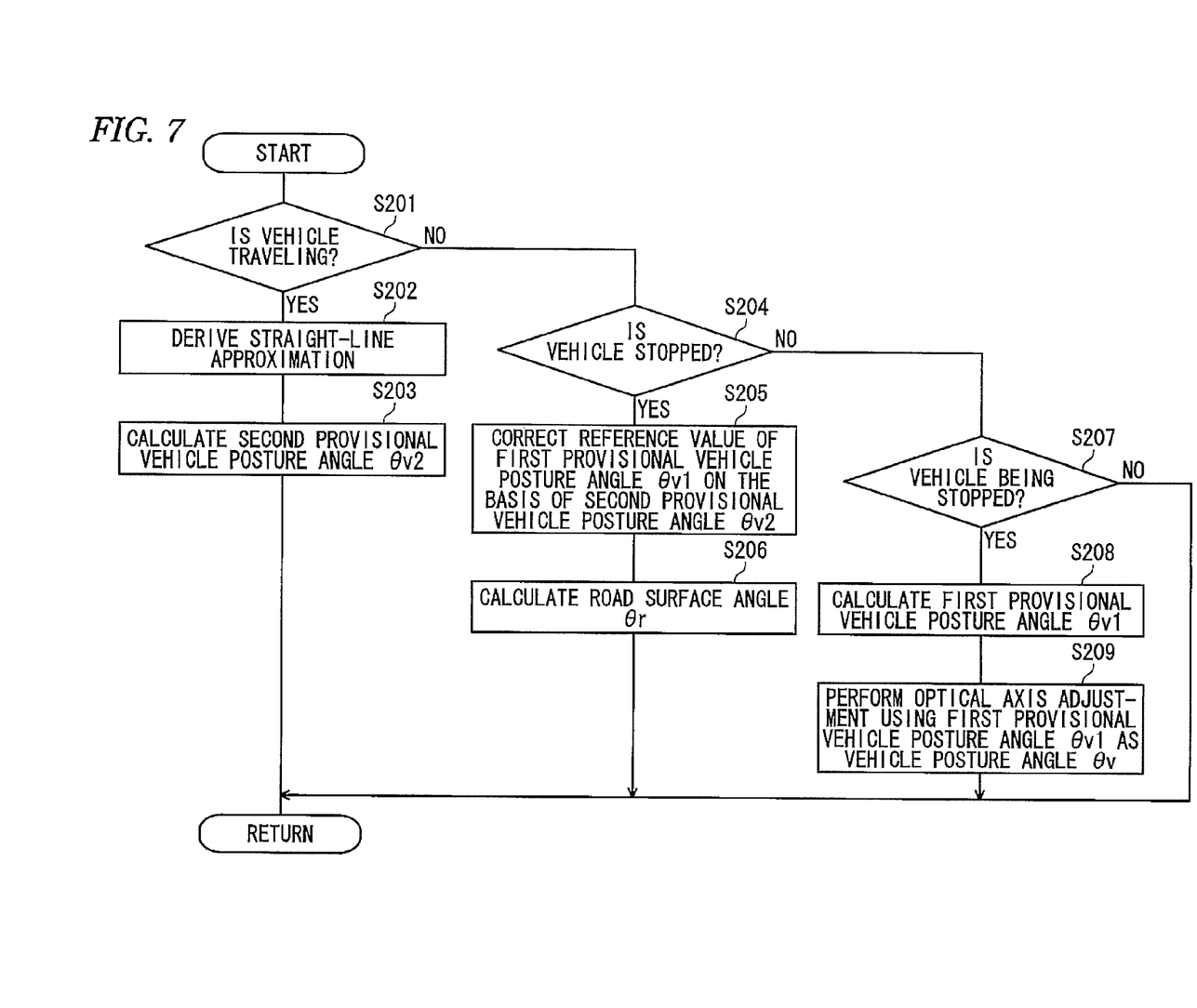
FIG. 7 is a flowchart illustrating another auto-leveling control performed by the leveling ECU according to the first embodiment.

Further, the leveling ECU 100 may perform the auto-leveling control as follows. FIG. 7 is a flowchart illustrating another auto-leveling control performed by the leveling ECU according to the first embodiment.

The control section 104 determines whether the vehicle is traveling (S201). In a case where the vehicle is traveling (Y of S201), the control section 104 derives a straight-line approximation from plural output values of the acceleration sensor 110 (S202). Further, the control section 104 calculates the second provisional vehicle posture angle θv2 from the straight-line approximation under the reference state which is recorded in advance and the derived straight-line approximation (S203), and then terminate the routine. In a case where the vehicle is traveling, it may be estimated that the time when the vehicle 300 maintains a constant speed is short and the vehicle 300 is accelerated or decelerated most of the time. Thus, it is possible to omit the determination of whether the vehicle 300 is accelerated or decelerated. In a case where the process of deriving the straight-line approximation is performed after determination of acceleration or deceleration of the vehicle 300, it is possible to calculate the second provisional vehicle posture angle θv2 with higher accuracy.

In a case where the vehicle is not traveling (N of S201), the control section 104 determines whether the vehicle is stopped (S204). In a case where the vehicle is stopped (Y of S204), the control section 104 corrects the reference value of the first provisional vehicle posture angle θv1 based on the second provisional vehicle posture angle θv2 (S205). Further, the control section 104 subtracts the corrected reference value of the first provisional vehicle posture angle θv1 from the total angle θ to calculate the road surface angle θr (S206). The calculated road surface angle θr is recorded in the memory 108 as the reference value of the road surface angle θr. Further, the control section 104 terminates the routine.

In a case where the vehicle is not stopped (N of S204), the control section 104 determines whether the vehicle is being stopped (S207). In a case where the vehicle is not being stopped (N of S207), the control section 104 terminates the routine. In a case where the vehicle is being stopped (Y of S207), the control section 104 subtracts the reference value of the road surface angle θr from the total angle θ to calculate the first provisional vehicle posture angle θv1 (S208). The reference value of the road surface angle θr is calculated using the corrected reference value of the first provisional vehicle posture angle θv1 based on the second provisional vehicle posture angle θv2. Further, the control section 104 performs the optical axis adjustment using the calculated first provisional vehicle posture angle θv1 as the vehicle posture angle θv (S209). The calculated first provisional vehicle posture angle θv1 is recorded in the memory 108 as the reference value of the first provisional vehicle posture angle θv1. Then, the control section 104 terminates the routine.

As described above, the leveling ECU 100 according to the present embodiment derives the first provisional vehicle posture angle θv1 based on the first calculation method and the second provisional vehicle posture angle θv2 based on the second calculation method from the total angle θ, corrects one of the first provisional vehicle posture angle θv1 and the second provisional vehicle posture angle θv2 so that the difference between the first provisional vehicle posture angle θv1 and the second provisional vehicle posture angle θv2 is reduced, and performs the optical axis adjustment using the corrected provisional vehicle posture angle as the vehicle posture angle θv. Thus, it is possible to enhance the accuracy of the auto-leveling control in which the optical axis adjustment of the lamp unit 10 is performed using the acceleration sensor 110.

Further, the leveling ECU 100 according to the present embodiment calculates two provisional vehicle posture angles by the different calculation methods from the acceleration detected in one acceleration sensor 110. Thus, compared with a case where plural provisional vehicle posture angles is calculated using plural acceleration sensors, it is possible to enhance the accuracy of the auto-leveling control at low cost. Here, the number of acceleration sensors is not limited to one, and a configuration may be used in which plural provisional vehicle posture angles is calculated by plural acceleration sensors. Even in this case, it is possible to enhance the accuracy of the auto-leveling control.

The above-mentioned leveling ECU 100 is an example of the invention. The leveling ECU 100 includes the receiving section 102 which receives an acceleration value detected in the acceleration sensor 110 and the control section 104 which performs the above-described auto-leveling control.

As another example of the invention, a vehicle lamp system may be used. The vehicle lamp system includes the lamp unit 10, the acceleration sensor 110, and the leveling ECU 100 (in the first embodiment, the acceleration sensor 110 is included in the leveling ECU 100).

The present invention is not limited to the above-described embodiments, and a modification such as a variety of design changes may be used by those skilled in the art, and embodiments having such a modification are included in the range of the invention.

What is claimed is:

1. A control device of a vehicle lamp, the device comprising:
   a receiving section which receives an acceleration value detected by an acceleration sensor, the acceleration value usable to derive a tilt angle of a vehicle with respect to a horizontal plane, wherein when the tilt angle of the vehicle with respect to the horizontal plane is represented as a total angle, the total angle includes a road surface angle which is a tilt angle of a road surface with respect to the horizontal plane and a vehicle posture angle which is a tilt angle of the vehicle with respect to the road surface; and
   a control section which controls an optical axis adjustment of the vehicle lamp,
   wherein the control section derives a first provisional vehicle posture angle from the total angle based on a first calculation method, and a second provisional vehicle posture angle based on a second calculation method, corrects one of the first provisional vehicle posture angle and the second provisional vehicle posture angle so that a difference between the first provisional vehicle posture angle and the second provisional vehicle posture angle, after correction, is smaller than before the correction, sets the corrected provisional vehicle posture angle to the vehicle posture angle, and outputs a control signal for instructing the optical axis adjustment of the vehicle lamp according to the vehicle posture angle, and
   wherein the second calculation method calculates the second provisional vehicle posture angle independently of the first provisional vehicle posture angle calculated by the first calculation method, and the first calculation method calculates the first provisional vehicle posture angle independently of the second provisional vehicle posture angle calculated by the second calculation method.

2. A vehicle lamp system comprising:

a vehicle lamp configured to adjust an optical axis;

an acceleration sensor which detects an acceleration value which is usable to derive a tilt angle of a vehicle with respect to a horizontal plane, wherein when the tilt angle of the vehicle with respect to the horizontal plane is represented as a total angle, the total angle includes a road surface angle which is a tilt angle of a road surface with respect to the horizontal plane and a vehicle posture angle which is a tilt angle of the vehicle with respect to the road surface; and the control device according to claim 1.

3. A control device of a vehicle lamp, the device comprising:

a receiving section which receives an acceleration value detected by an acceleration sensor, the acceleration value usable to derive a tilt angle of a vehicle with respect to a horizontal plane, wherein when the tilt angle of the vehicle with respect to the horizontal plane is represented as a total angle, the total angle includes a road surface angle which is a tilt angle of a road surface with respect to the horizontal plane and a vehicle posture angle which is a tilt angle of the vehicle with respect to the road surface; and a control section which controls an optical axis adjustment of the vehicle lamp, wherein the control section derives a first provisional vehicle posture angle from the total angle based on a first calculation method, and a second provisional vehicle posture angle based on a second calculation method, corrects one of the first provisional vehicle posture angle and the second provisional vehicle posture angle so that a difference between the first provisional vehicle posture angle and the second provisional vehicle posture angle, after correction, is smaller than before the correction, sets the corrected provisional vehicle posture angle to the vehicle posture angle, and outputs a control signal for instructing the optical axis adjustment of the vehicle lamp according to the vehicle posture angle, wherein the control section retains a reference value of the road surface angle and a reference value of the first provisional vehicle posture angle, wherein in the first calculation method, the reference value of the road surface angle is subtracted from the total angle during vehicle stop to derive the first provisional vehicle posture angle, the derived first provisional vehicle posture angle is set as a new reference value, the reference value of the first provisional vehicle posture angle is subtracted from the total angle during vehicle stop to derive the road surface angle, and the derived road surface angle is set as a new reference value, and wherein in the second calculation method, the second provisional vehicle posture angle is derived from a ratio of a temporal change amount of acceleration in a forward-backward direction of the vehicle and a temporal change amount of acceleration in an up-down direction of the vehicle during at least one of acceleration and deceleration of the vehicle.

4. The control device according to claim 3, wherein the control section corrects the first provisional vehicle posture angle based on the second provisional vehicle posture angle.

5. A vehicle lamp system comprising:

a vehicle lamp configured to adjust an optical axis;

an acceleration sensor which detects an acceleration value which is usable to derive a tilt angle of a vehicle with respect to a horizontal plane, wherein when the tilt angle of the vehicle with respect to the horizontal plane is represented as a total angle, the total angle includes a road surface angle which is a tilt angle of a road surface with respect to the horizontal plane and a vehicle posture angle which is a tilt angle of the vehicle with respect to the road surface; and the control device according to claim 3.

6. A control device of a vehicle lamp, the device comprising:

a receiving section which receives an acceleration value detected by an acceleration sensor, the acceleration value usable to derive a tilt angle of a vehicle with respect to a horizontal plane, wherein when the tilt angle of the vehicle with respect to the horizontal plane is represented as a total angle, the total angle includes a road surface angle which is a tilt angle of a road surface with respect to the horizontal plane and a vehicle posture angle which is a tilt angle of the vehicle with respect to the road surface; and a control section which controls an optical axis adjustment of the vehicle lamp, wherein the control section derives a first provisional vehicle posture angle from the total angle based on a first calculation method, and a second provisional vehicle posture angle based on a second calculation method, corrects one of the first provisional vehicle posture angle and the second provisional vehicle posture angle so that a difference between the first provisional vehicle posture angle and the second provisional vehicle posture angle, after correction, is smaller than before the correction, sets the corrected provisional vehicle posture angle to the vehicle posture angle, and outputs a control signal for instructing the optical axis adjustment of the vehicle lamp according to the vehicle posture angle, and wherein the control section generates match data in which a certain total angle and a certain vehicle posture angle are matched with each other based on a history of the total angle, and corrects at least one of the first provisional vehicle posture angle and the second provisional vehicle posture angle based on the match data when the total angle is the certain total angle.

7. A vehicle lamp system comprising:

a vehicle lamp configured to adjust an optical axis;

an acceleration sensor which detects an acceleration value which is usable to derive a tilt angle of a vehicle with respect to a horizontal plane, wherein when the tilt angle of the vehicle with respect to the horizontal plane is represented as a total angle, the total angle includes a road surface angle which is a tilt angle of a road surface with respect to the horizontal plane and a vehicle posture angle which is a tilt angle of the vehicle with respect to the road surface; and the control device according to claim 6.

* * * * *